United States Patent
Flynn

(10) Patent No.: US 7,223,053 B2
(45) Date of Patent: May 29, 2007

(54) HELICAL FLUTE END MILL WITH MULTI-SECTION CUTTING EDGE

(75) Inventor: Clifford M. Flynn, Pittsfield, MA (US)

(73) Assignee: Berkshire Precision Tool, LLC, Pittsfield, MA (US)

( * ) Notice: Subject to any disclaimer, the term of this patent is extended or adjusted under 35 U.S.C. 154(b) by 0 days.

(21) Appl. No.: 10/931,733

(22) Filed: Sep. 1, 2004

(65) Prior Publication Data

US 2006/0045637 A1    Mar. 2, 2006

(51) Int. Cl.
B23C 5/10    (2006.01)

(52) U.S. Cl. .............................. 407/53; 407/60; 407/63

(58) Field of Classification Search ................. 407/30, 407/53, 54, 55, 60–63
See application file for complete search history.

(56) References Cited

U.S. PATENT DOCUMENTS

| | | | |
|---|---|---|---|
| 3,157,938 A * | 11/1964 | Sabberwal et al. .......... 407/63 |
| 3,387,511 A * | 6/1968 | Ackart, Sr. et al. ......... 408/230 |
| 4,572,714 A * | 2/1986 | Suzuki et al. .............. 408/230 |
| 4,963,059 A * | 10/1990 | Hiyama ....................... 407/60 |
| 5,049,009 A | 9/1991 | Beck et al. |
| 6,007,276 A | 12/1999 | Wardell ....................... 407/54 |
| 6,168,355 B1 * | 1/2001 | Wardell ....................... 407/54 |
| 6,179,528 B1 | 1/2001 | Wardell ....................... 407/54 |
| 6,368,030 B1 * | 4/2002 | Sato et al. .................... 407/53 |
| 6,439,811 B1 | 8/2002 | Wardell ....................... 407/54 |
| 6,991,409 B2 * | 1/2006 | Noland ........................ 407/63 |
| 2003/0118411 A1 * | 6/2003 | Flynn et al. .................. 407/53 |
| 2004/0105729 A1 * | 6/2004 | Giessler et al. ............... 407/53 |
| 2004/0120777 A1 | 6/2004 | Noland ........................ 5/10 |
| 2006/0067797 A1 | 3/2006 | Calamia ...................... 407/53 |

FOREIGN PATENT DOCUMENTS

| | | | | | |
|---|---|---|---|---|---|
| DE | 3413290 A | * | 10/1985 | | |
| DE | 265097 A | * | 2/1989 | | |
| JP | 63089212 A | * | 4/1988 | | |
| JP | 63089213 A | * | 4/1988 | | |
| JP | 63089214 A | * | 4/1988 | | |
| JP | 63-74512 | | 5/1988 | | 5/10 |
| JP | 04201108 A | * | 7/1992 | | |
| JP | 04201109 A | * | 7/1992 | | |

OTHER PUBLICATIONS

International Search Report.

* cited by examiner

*Primary Examiner*—Monica Carter
*Assistant Examiner*—Sara Addisu
(74) *Attorney, Agent, or Firm*—O'Shea, Getz & Kosakowski, P.C.

(57) ABSTRACT

An end mill is provided that includes a shank section and a fluted section. One or more helical teeth are disposed along an outer surface of the fluted section. Each helical tooth has a cutting surface and a relief wall that intersect to form an angle defining a helical cutting edge. The cutting surface of each helical tooth includes a first section, a second section, and a take-off peak disposed between the first section and second section. The cutting edge of each helical tooth includes a first portion having a first constant angle, and a second portion having a second constant angle unequal to the first constant angle, and an arcuate transition section connecting the first portion and second portion. Some embodiments of the present invention include more portions than the aforesaid first and second portions.

19 Claims, 8 Drawing Sheets

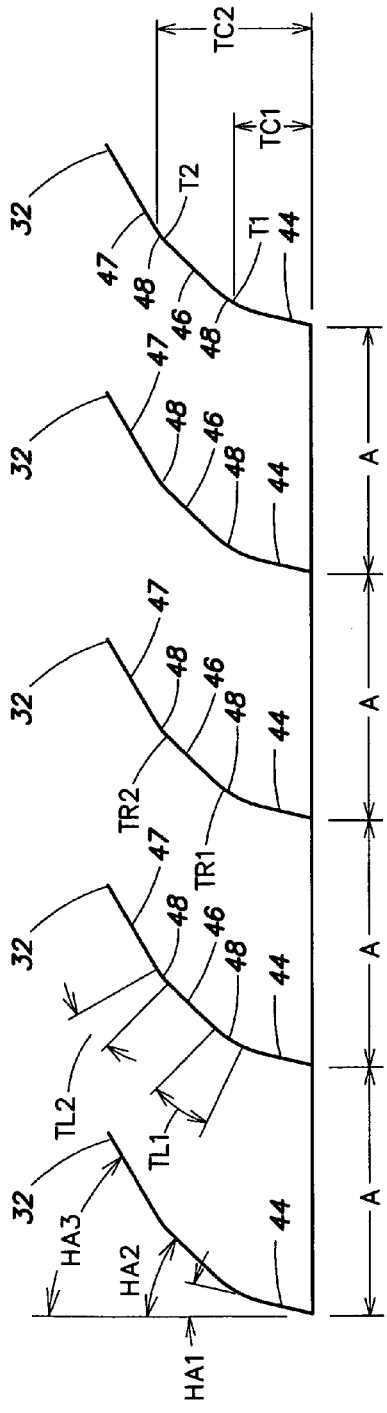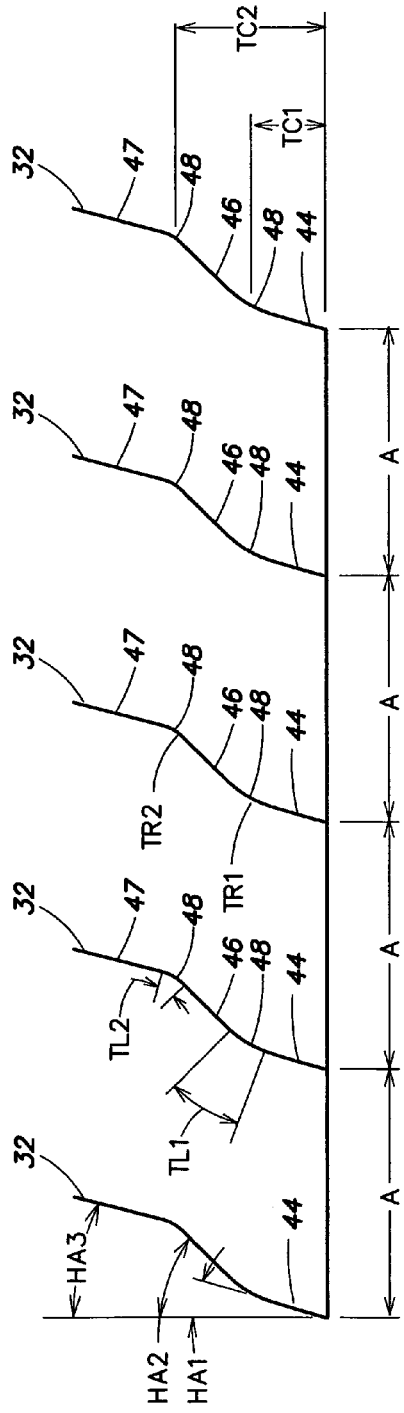

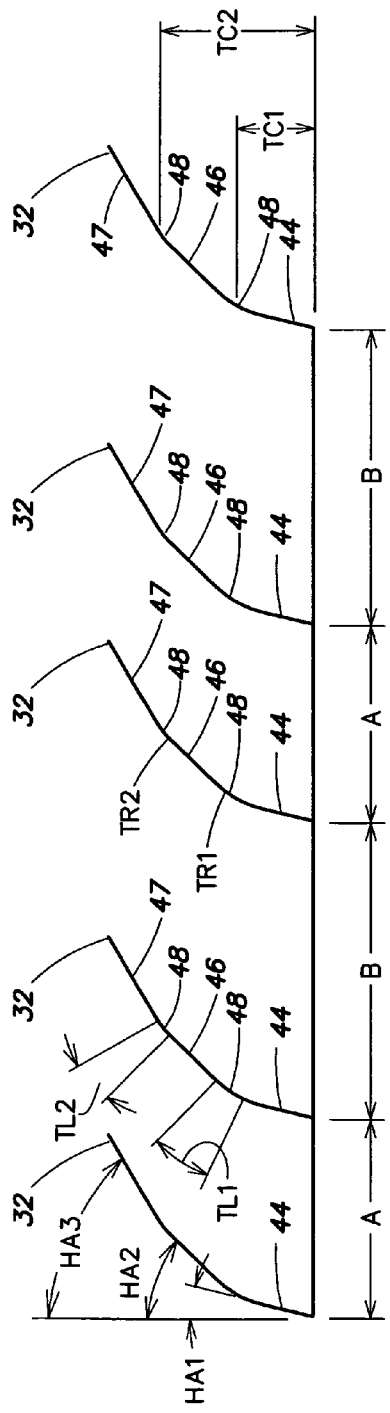
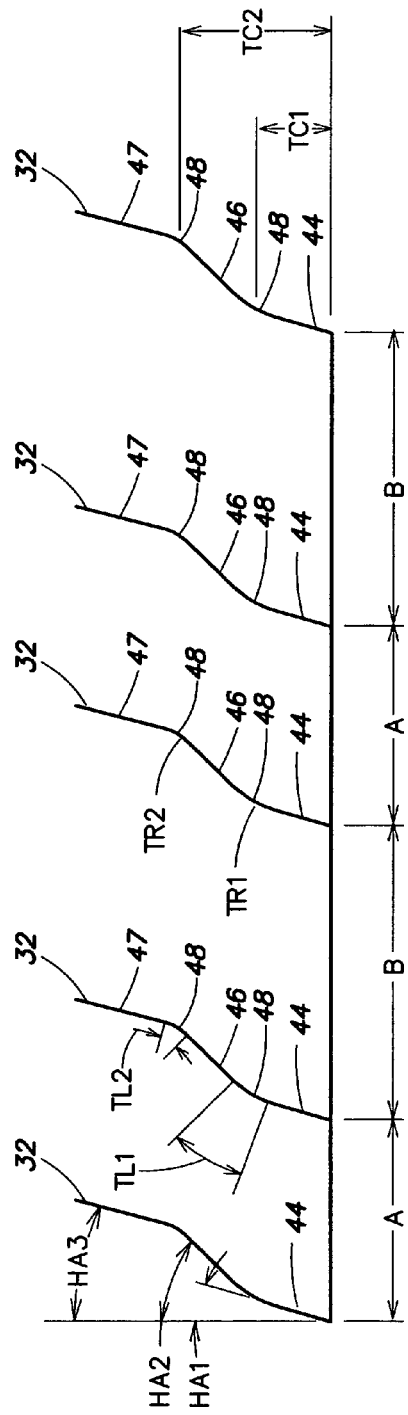
FIG. 8
FIG. 9

US 7,223,053 B2

HELICAL FLUTE END MILL WITH MULTI-SECTION CUTTING EDGE

BACKGROUND OF THE INVENTION

1. Technical Field

The present invention relates to machine tool rotary cutting tools in general, and to end mills in particular.

2. Background Information

A variety of end mills for use with rotating milling cutters are available and well known. Depending on design, such end mills are generally used in right hand cutting, right hand spiral and center cutting.

Some prior art end-mills have helical flutes that follow a single continuous cutting edge angle. For example, it is known in the art to form flutes at a low helix angle or a high helix angle. A "low helix" (or low helical flute) is a flute that helically "winds" around a cylinder at an angle of no more than 45 degrees. A "super" low helical flute would be a flute that winds around a cylinder at an angle of at no more than 15 degrees. A "high helix" (or high helical flute) is a flute that helically winds around a cylinder at an angle of greater than 45 degrees, while a "super" high helical flute winds around a cylinder at an angle of at least 65 degrees.

Other prior art end mills have one or more flutes with a cutting edge that continuously changes along its length. For example, prior advancements relating to material removal and feed rate of end mills have been accomplished by: (1) varying the spiral lead angle; (2) increasing the depth of the flutes in the body portion of the end mill; (3) changing the radial rake angle; (4) changing the clearance angles of the cutting edges; and (5) forming chip splitting grooves in the flutes.

While such variations have proven successful in various applications, they are also the source of certain disadvantages and limitations. For example, such variations may weaken portions of the tool and may not be suitable for particular applications (e.g., regarding milling time, rough cut, finish cut, etc.). Furthermore, existing end mills are typically not efficient for both rough cutting and finish cutting. It is often advantageous when performing an end-mill machining operation to create many small chips, rather than fewer elongated curlicue chips. This allows, for example, rapid rate of removal of material from a work piece without undue heating of the end-mill tool.

What is needed, therefore, is an end mill that has improved characteristics relative to the end mills currently available.

SUMMARY OF THE INVENTION

According to the present invention, an end mill is provided that includes a shank section and a fluted section. One or more helical teeth are disposed along an outer surface of the fluted section. Each helical tooth has a cutting surface and a relief wall that intersect to form an angle defining a helical cutting edge. The cutting surface of each helical tooth includes a first section, a second section, and a take-off peak disposed between the first section and second section. The cutting edge of each helical tooth includes a first portion having a first constant angle, and a second portion having a second constant angle unequal to the first constant angle, and an arcuate transition section connecting the first portion and second portion. Some embodiments of the present invention include more portions than the aforesaid first and second portions.

An advantage of the present invention end mill is that the end mill can be specifically configured to a particular application. The present invention uses constant angle helix portions, arcuate transition sections, and helix indexing to create the desired chip size for a particularly milling application. For example, a desirable milling feed rate can be accomplished with a first material given an end mill with a particular combination of constant angle helix portions, arcuate transition sections, and helix indexing. That same combination may not, however, provide a desirable milling feed rate for a different type of material. The present invention enables the selection of a combination of flute features that will provide desirable end mill performance.

Another advantage provided by the present invention end mill is that it enhances chip removal. The present invention enables an optimum size chip to be produced, which size facilitates chip ejection.

These and other objects, features and advantages of the present invention will become apparent in light of the detailed description of the best mode embodiment thereof, as illustrated in the accompanying drawings.

BRIEF DESCRIPTION OF THE DRAWINGS

FIGS. 6–13 are diagrams illustrating the cutting edges of a five-flute end mill according to the present invention. Each diagram shows all five cutting edges having a plurality of portions disposed at various constant helix angles (HA1, HA2, HA3), and arcuate transition sections (e.g., T1, T2) connecting the portions. Some of the embodiments have cutting edges equally indexed around the circumference of the end mill. Other embodiments have cutting edges with unequal index spacing around the circumference of the end mill.

DETAILED DESCRIPTION OF THE INVENTION

Figure 1:
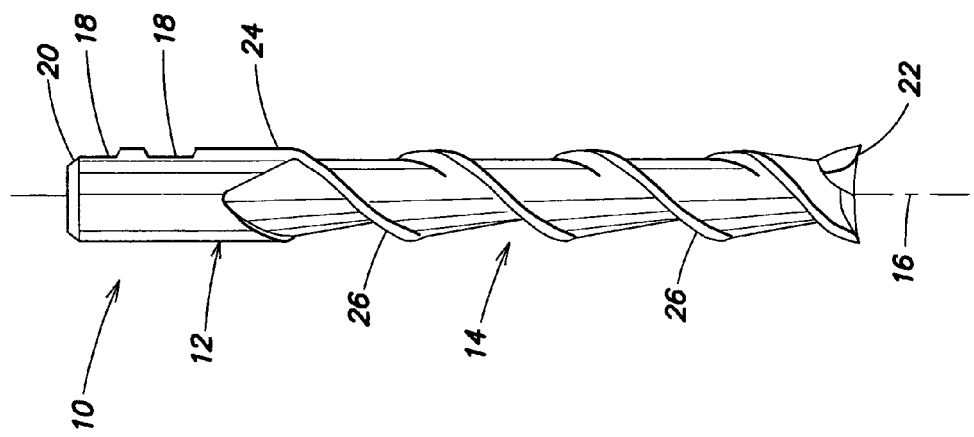
FIG. 1 shows an end mill having two flutes.

Now referring to FIG. 1, an end mill 10 is shown that includes a shank section 12 and a fluted section 14, both of which extend along an axis of rotation 16 of the end mill 10. The shank section 12 is essentially cylindrical in shape and possesses two rectangular grooves 18 cut into its outer surface. The grooves 18, although not required, facilitate retention of the end mill 10 within certain types of rotary driven apparatus (e.g., a milling machine). Acceptable end mill 10 materials include, but are not limited to, high strength steel/cobalt, ceramics, carbides, etc.

Figure 2:
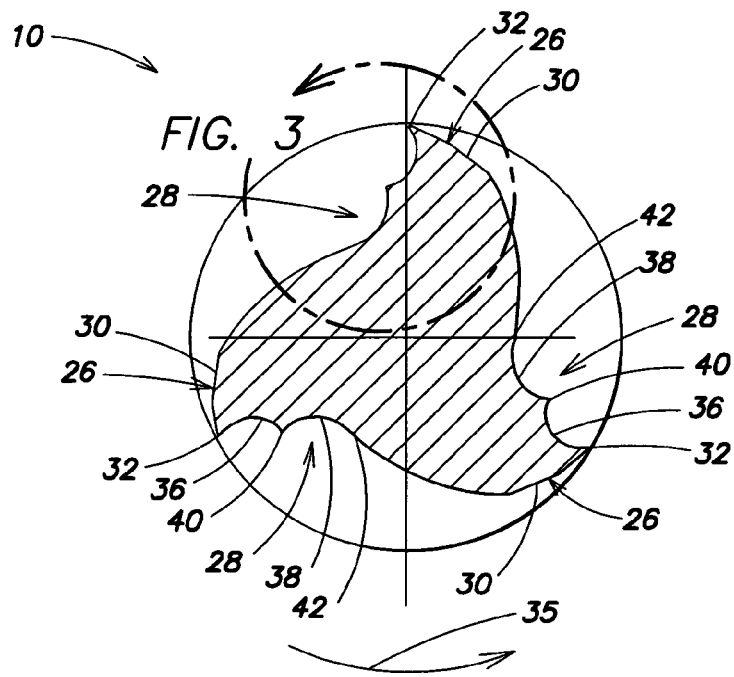
FIG. 2 is a cross-sectional view of a present invention end mill having three flutes.

The fluted section 14 of end mill 10 has a first end 20 integrally attached to the shank section 12, a second end 22, and an outer surface 24. A plurality of helical teeth 26 are disposed along the outer surface 24 of the fluted section 14. FIG. 1 illustrates an embodiment having two helical teeth 26. FIG. 2 illustrates an embodiment having three helical teeth 26. Other embodiments may have more than three helical teeth 26.

Figure 3:
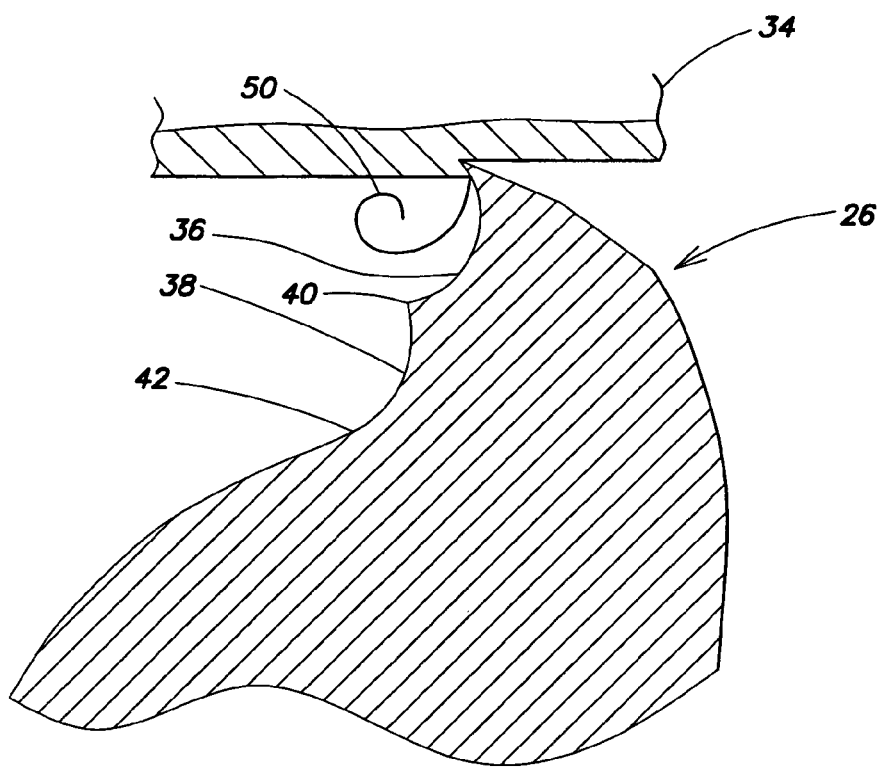
FIG. 3 is a partial view of the end mill shown in FIG. 2.
Figure 15:
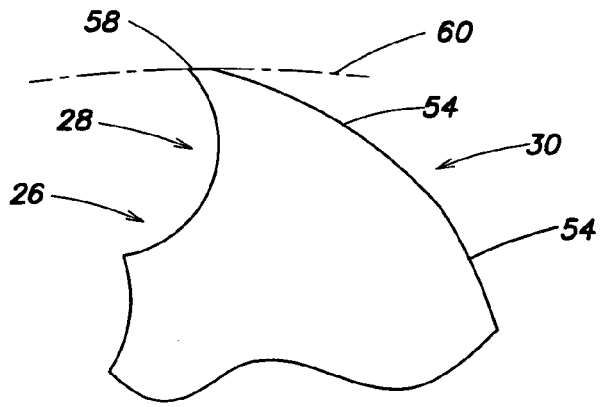
FIG. 15 is a diagrammatic partial view of a cutting tooth.
Figure 16:
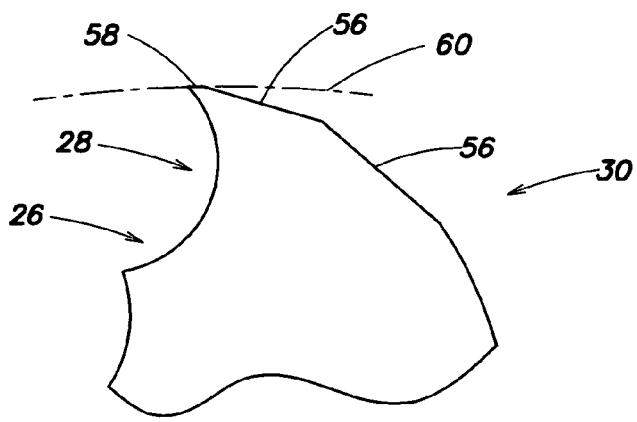
FIG. 16 is a diagrammatic partial view of a cutting tooth.
Figure 17:
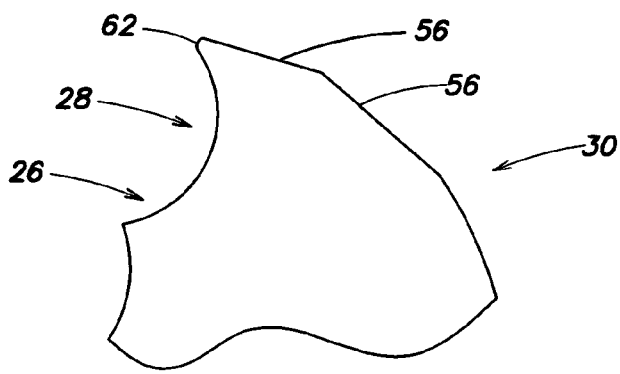
FIG. 17 is a diagrammatic partial view of a cutting tooth.

Now referring to FIGS. 2 and 3, each helical tooth 26 has a cutting surface 28 and a relief wall 30 that intersect to form an angle that defines a helical cutting edge 32. The helical cutting edge 32 defines an outer circumferential cutting path; i.e., the outermost edge contacting the work piece 34 (see FIG. 3). Arrow 35 indicates the rotational direction of the end mill 10. A variety of different relief wall 30 configurations can be used with the present invention end mill 10 and the present invention end mill 10 is not, therefore, limited to any particular configuration. For example, the relief wall 30 can include one or more arcuately shaped sections 54 (see FIG. 15), or one or more linear shaped sections 56 (see FIGS. 3, 16, 17). The helical tooth relief wall 30 embodiments partially shown in FIGS. 15 and 16 include a cylindrically shaped first region 58. The first region 58 is disposed along the circumference 60 of the fluted section 14. The helical tooth relief wall 30 embodiment partially shown in FIG. 17 includes a radiused edge 62 that extends between the cutting surface 28 and the relief wall 30. The radiused edge 62 is shown in FIG. 17 with a relief wall configuration that includes linear sections 56. In alternative embodiments, the radiused edge 62 can be used with an arcuately shaped relief wall 30.

The cutting surface 28 includes a first section 36, a second section 38, and a take-off peak 40 disposed between the first section 36 and second section 38. The first section 36 of the cutting surface 28 has a curvature that at least substantially follows a first radius. The second section 38 of the cutting surface 28 has a curvature that at least substantially follows a second radius. The take-off peak 40 is the point of intersection between the first section 36 and the second section 38. The first and second sections 36, 38 are not limited to circular shapes, and may follow a non-circular arcuate path. Hence, the description that each section substantially follows a radius. The second section 38 terminates approximately at the inflection point 42 of the flute curvature.

Figure 4:
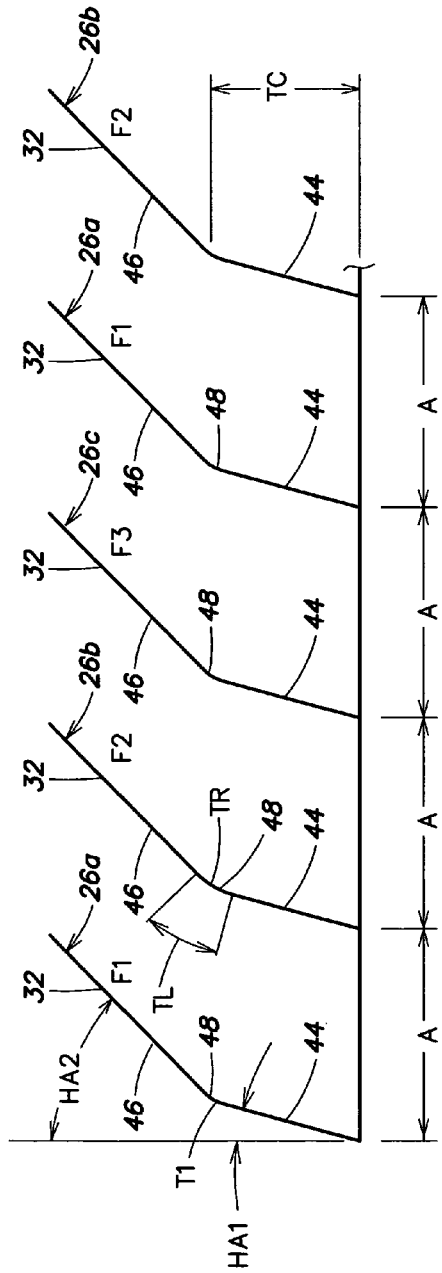
FIG. 4 is a diagram illustrating the cutting edges of a three-flute end mill according to the present invention. Each diagram shows all three cutting edges having a first cutting edge portion disposed at a first constant helix angle (HA1), and a second cutting edge portion disposed at a second constant helix angle (HA2), and an arcuate transition section (T1) connecting the portions. The cutting edges are equally indexed around the circumference of the end mill, spaced apart from one another by a distance A.
Figure 5:
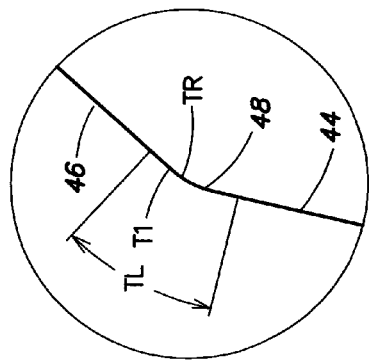
FIG. 5 is an enlarged portion of the diagram shown in FIG. 4.
Figure 10:
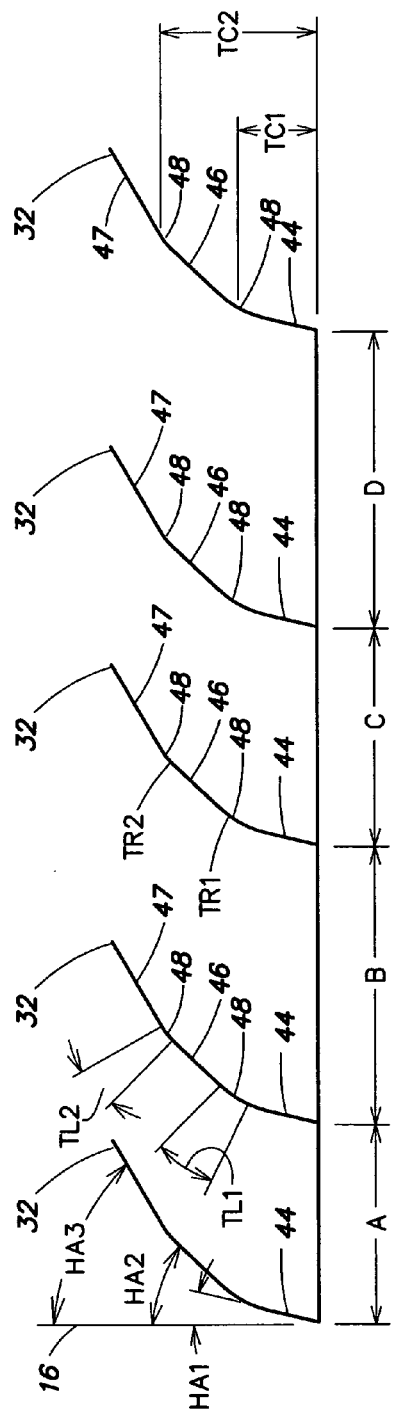
Figure 11:
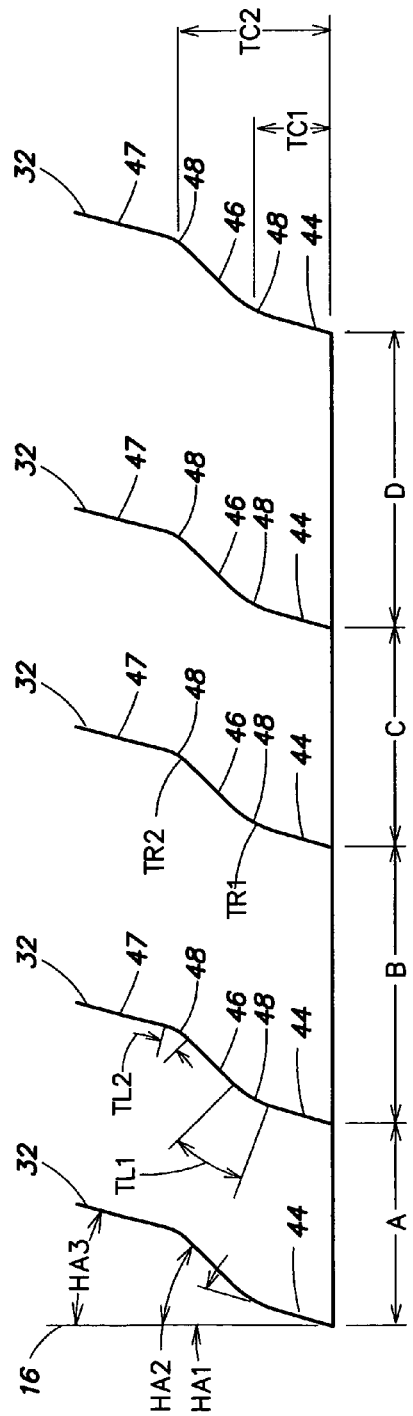
Figure 12:
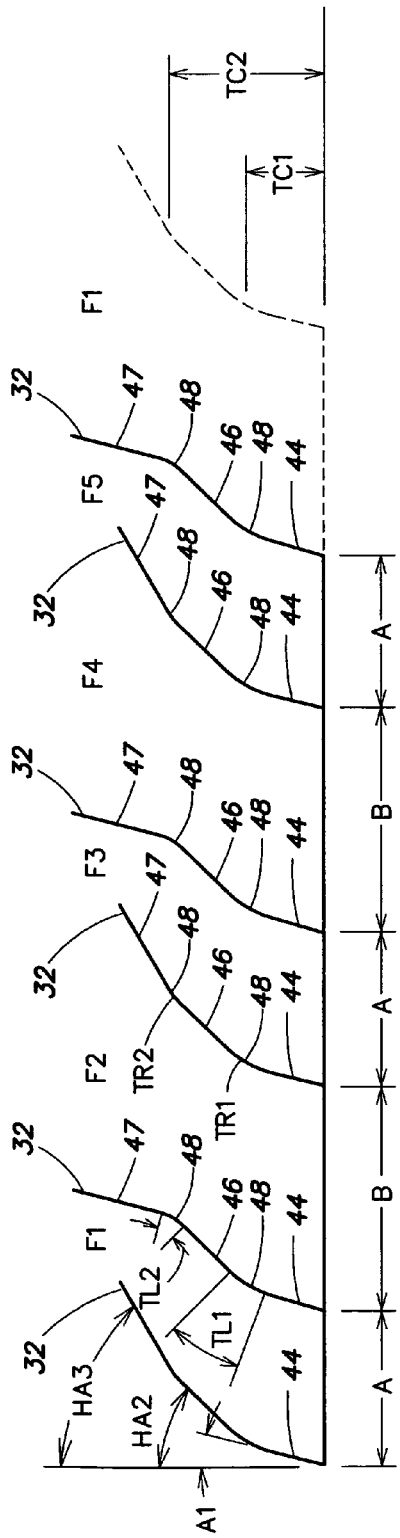
Figure 13:
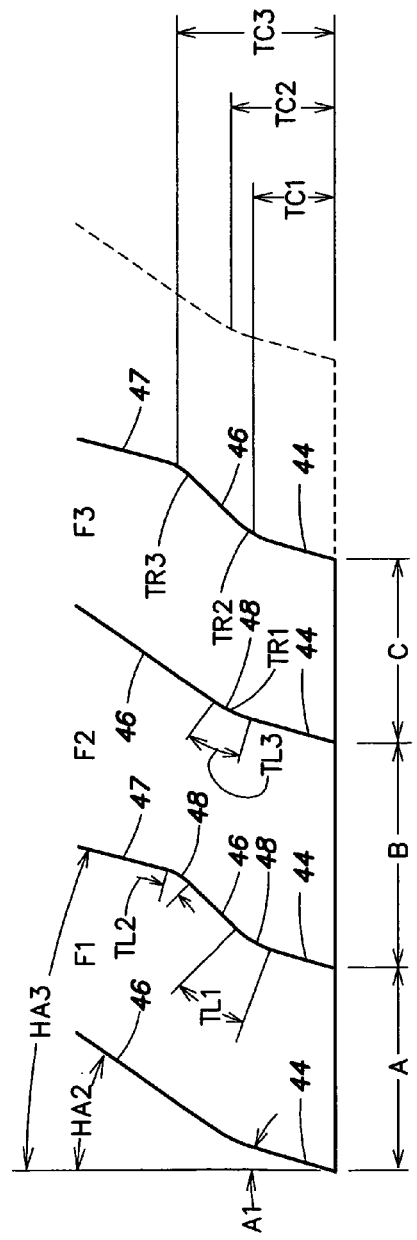

Now referring to FIGS. 4–13, the cutting edge 32 of each helical tooth 26 includes at least a first portion 44 and a second portion 46, and an arcuate transition section 48 connecting the first portion 44 and second portion 46. FIGS. 4 and 5 diagrammatically show the fluted section 14 of an end mill 10, wherein each of the helical teeth 26 includes a first portion 44 and a second portion 46, connected together by an arcuate transition section 48. The helical tooth pattern is represented as 26a, 26b, 26c, which repeats (see also FIGS. 12 and 13 which label the flutes F1, F2, F3, etc.). The first portion 44 extends at a constant first helix angle "HA1" relative to the axis of rotation 16 of the end mill 10. The second portion 46 extends at a constant second helix angle "HA2" relative to the axis of rotation 16 of the end mill 10. The first helix angle does not equal the second helix angle (HA1≠HA2). In some embodiments, each helical tooth 26 includes more than two portions (e.g., see FIGS. 6–12, third portion 47), each of which is connected to an adjacent portion by an arcuate transition section 48.

Each arcuate transition section 48 separating adjacent portions of a cutting edge 32 has a length (TL), a radius (TR), and a center point (TC). The length (TL) extends from one linear portion to an adjacent linear portion, along the arcuate path of the arcuate transition section 48. The arcuate path may be circular or any other arcuate geometry that enables adjacent linear portions to be connected without the portions intersecting. In those embodiments wherein the arcuate transition section 48 is not circular, the radius (TR) of the arcuate transition section 48 is a radius that substantially fits the arcuate path. In all cases, the arcuate transition section 48 has a length and radius greater than would be present if two cutting edge 32 portions having constant, but dissimilar, helix angles intersected and the cutting edge 32 was broken at the intersection by deburring or the like. FIGS. 4–13 show a number of different cutting edge embodiments. Different arcuate transition section lengths (TL), radii (TR), and centers (TC) are labeled to distinguish the differences; e.g., TL1, TL2, etc.

The circumferential spacing (also referred to as "indexing distance") of the point where each helical tooth 26 initiates can also be varied. In the embodiments diagrammatically shown in FIGS. 3, 5, and 6, the circumferential spacing between cutting edges 32 (and therefore flutes) is a uniform distance "A". In the embodiments diagrammatically shown in FIGS. 7–10, the circumferential spacing between cutting edges 32 (and therefore flutes) is varied between combinations of the distances "A", "B", "C", and "D", where A≠B≠C≠D. The combinations shown are illustrative of the various indexing configurations. The present invention is not limited to the embodiments shown.

Figure 14:
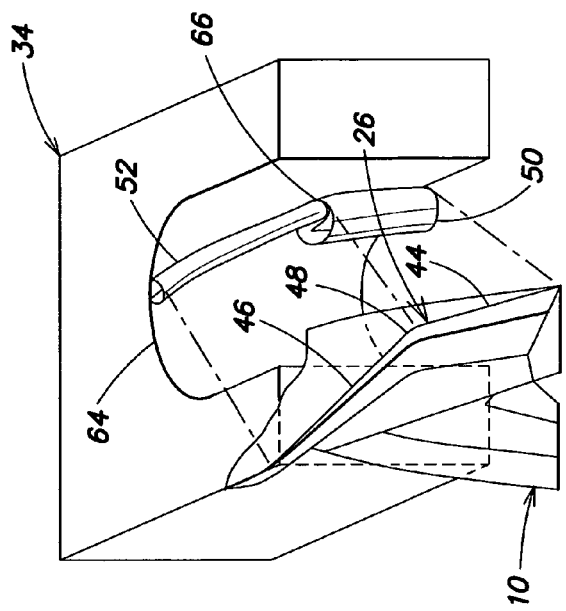
FIG. 14 is a diagrammatic exploded perspective view of an end mill and a work piece illustrating a pair of chips being formed.

Referring to FIGS. 2–4 and 14, in the operation of the end mill 10, the helical teeth 26 of the end mill 10 engage the work piece 34 as the end mill 10 rotates, and the end mill 10 and work piece 34 travel relative to one another. A chip 50 formed from the engagement of the first portion 44 of the helical tooth 26 will be characterized by several factors including the constant helix angle (HA1) of the first portion 44. At the same time, a second chip 52 will be formed by the engagement of the second portion 46 of the helical tooth 26 with the work piece 34, and will be characterized by factors including the constant helix angle (HA2) of the second portion 46. The transition section 48 disposed between the first and second portions 44,46 promotes the formation of two separate chips 50,52, each characterized by the angle of the portion with which it was engaged. As a result, a greater number of smaller chips are produced. An embodiment that has "n" number of constant helix angle portions will likely form "n" number of separate chips. For example, FIG. 14 diagrammatically shows an exploded view of an end mill 10 and a work piece 34. The end mill 10 has been used to cut a slot 64 in the work piece 34. The two portions 44,46 of the end mill helical tooth 26 create two distinct and separate chips during a milling process; one chip 50 is created by the first portion 44 of the helical tooth 26 and the other chip 52 is created by the second portion 46 of the helical tooth 26. The chips 50,52 are separated from one another at the point 66 corresponding to the transition section 48.

The provision of a plurality of cutting edge 32 portions, each having a different constant helix angle, increases the application alternatives available using the present invention end mill 10. Certain applications may favor having an initial portion of cutting edge 32 disposed at a particular constant helix angle (e.g., a relatively low helix angle), and subsequent portions with increasingly larger constant helix angles. Likewise, it is possible to vary the lengths of the portions and/or the lengths of the arcuate transition sections

48 disposed therebetween, and/or the radii of the arcuate transition sections 48, and/or the indexing between helical teeth 26. FIGS. 5–13 all diagrammatically show embodiments having various configurations of the aforesaid characteristics.

One of the advantages provided by the present invention end mill 10 is that an end mill 10 is provided that can be tailored to a particular material so that particular chip sizes are produced and readily ejected from the flutes of the end mill 10.

Another advantage of the present invention end mill 10 is that undesirable chatter can be substantially reduced. The helical cutting edge 32 of each flute can be configured so as to be different in one or more ways than the helical cutting edges 32 adjacent that edge. As a result, the periodic forces that are created by a symmetrical end mill 10 are decreased or eliminated. Consequently, the chatter that results from the periodic forces is also decreased or eliminated. Decreasing the chatter improves the cutting action and tool life of the end mill 10, surface finish on the material, and decreases the stress on the milling machines.

Decreasing the chatter may also make it possible to use a faster feed rate or larger chip load per tooth 26. A deeper depth of cut is often possible due to chatter reduction in the cutting action.

Although this invention has been shown and described with respect to the detailed embodiments thereof, it will be understood by those skilled in the art that various changes in form and detail thereof may be made without departing from the spirit and the scope of the invention. For example, although the present invention was described in the context of an end mill, the invention is also applicable to other types of cutting tools, including router bits, taps, thread mills, and insertable helical tooling.

What is claimed is:

1. An end mill having an axis of rotation, comprising:
   a shank section extending along the axis of rotation;
   a fluted section extending along the axis of rotation, having a first end integrally attached to the shank section, a second end, and an outer surface; and
   one or more helical teeth disposed along the outer surface of the fluted section, each helical tooth having a cutting surface and a relief wall that intersect to form an angle defining a helical cutting edge;
   wherein the cutting surface of each helical tooth includes a first section, a second section, and a take-off peak disposed between the first section and second section; and
   wherein the cutting edge of each helical tooth includes a first portion having a constant first angle, and a second portion having a constant second angle unequal to the first angle, and an arcuate transition section connecting the first portion and second portion.

2. The end mill of claim 1, wherein the constant first angles of at least two of the one or more helical teeth are different from one another.

3. The end mill of claim 1, wherein the constant second angles of at least two of the one or more helical teeth are different from one another.

4. The end mill of claim 1, wherein the arcuate transition section of each of the one or more helical teeth includes a length and a radius.

5. The end mill of claim 1, wherein the end mill includes a plurality of helical teeth, and wherein the arcuate transition section of each of the plurality helical teeth includes a length and a radius, and the radius of each arcuate transition section is substantially constant over the length of the arcuate transition section.

6. The end mill of claim 5, wherein the radii of the arcuate transition sections of at least two of the plurality of helical teeth are different from one another.

7. The end mill of claim 5, wherein the length of the arcuate transition sections of at least two of the plurality of helical teeth are different from one another.

8. The end mill of claim 1, wherein the one or more helical teeth include at least a first helical tooth and a second helical tooth spaced apart from each other by a first indexing distance and a second indexing distance, and one of the first indexing distance or the second indexing distance is greater than the other of the first indexing distance or second indexing distance.

9. The end mill of claim 1, wherein the first portion extends a first length along the cutting edge, and the second portion extends a second length along the cutting edge.

10. The end mill of claim 9, wherein the first length and the second length are not equal.

11. The end mill of claim 1, wherein the cutting edge of each helical tooth further comprises a third portion having a constant third angle, and an arcuate transition section connecting the second portion and third portion.

12. An end mill, comprising:
    a shank section;
    a fluted section having a first end integrally attached to the shank section, a second end, and an outer surface; and
    a plurality of helical teeth disposed along the outer surface of the fluted section, each helical tooth having a cutting surface and a relief wall that intersect to form an angle defining a helical cutting edge;
    wherein the cutting surface of each helical tooth includes a first section, a second section, and a take-off peak disposed between the first section and second section;
    wherein the cutting edge of each helical tooth includes a first portion having a constant first angle, and a second portion having a constant second angle unequal to the first angle, and an arcuate transition section connecting the first portion and second portion; and
    wherein the arcuate transition section of each of the one or more helical teeth includes a radius, and the radii of the arcuate transition sections of at least two of the plurality of helical teeth are different from one another.

13. An end mill, comprising:
    a shank section;
    a fluted section having a first end integrally attached to the shank section, a second end, and an outer surface; and
    a plurality of helical teeth disposed along the outer surface of the fluted section, each helical tooth having a cutting surface and a relief wall that intersect to form an angle defining a helical cutting edge;
    wherein the cutting surface of each helical tooth includes a first section, a second section, and a take-off peak disposed between the first section and second section;
    wherein the cutting edge of each helical tooth includes a first portion having a constant first angle, and a second portion having a constant second angle unequal to the first angle, and an arcuate transition section connecting the first portion and second portion; and
    wherein the arcuate transition section of each of the one or more helical teeth includes a length, and the lengths of the arcuate transition sections of at least two of the plurality of helical teeth are different from one another.

14. An end mill, comprising:
    a shank section;

a fluted section having a first end integrally attached to the shank section, a second end, and an outer surface; and a plurality of helical teeth disposed along the outer surface of the fluted section, each helical tooth having a cutting surface and a relief wall that intersect to form an angle defining a helical cutting edge;

wherein the cutting edge of each helical tooth includes a first portion having a constant first angle, and a second portion having a constant second angle unequal to the first angle, and an arcuate transition section connecting the first portion and second portion; and wherein the arcuate transition section of each of the one or more helical teeth includes a radius, and the radii of the arcuate transition sections of at least two of the plurality of helical teeth are different from one another.

15. An end mill, comprising:

a shank section;

a fluted section having a first end integrally attached to the shank section, a second end, and an outer surface; and a plurality of helical teeth disposed along the outer surface of the fluted section, each helical tooth having a cutting surface and a relief wall that intersect to form an angle defining a helical cutting edge;

wherein the cutting edge of each helical tooth includes a first portion having a constant first angle, and a second portion having a constant second angle unequal to the first angle, and an arcuate transition section connecting the first portion and second portion; and wherein the arcuate transition section of each of the one or more helical teeth includes a length, and the lengths of the arcuate transition sections of at least two of the plurality of helical teeth are different from one another.

16. An end mill, comprising:

a shank section;

a fluted section having a first end integrally attached to the shank section, a second end, and an outer surface; and a plurality of helical teeth disposed along the outer surface of the fluted section, each helical tooth having a cutting surface and a relief wall that intersect to form an angle defining a helical cutting edge;

wherein the cutting edge of each helical tooth includes more than two portions, each cutting edge portion having a constant angle unequal to that of the other cutting edge portions, and an arcuate transition section connecting adjacent cutting edge portions.

17. The end mill of claim 16, wherein the more than two cutting edge portions includes a first portion that extends a first length at a first constant angle along the cutting edge, a second portion that extends a second length at a second constant angle along the cutting edge, and a third portion that extends a third length at a third constant angle along the cutting edge.

18. The end mill of claim 17, wherein the first length and the second length are not equal.

19. The end mill of claim 16 wherein one or more of the arcuate transition sections include a plurality of radii.

* * * * *

UNITED STATES PATENT AND TRADEMARK OFFICE
CERTIFICATE OF CORRECTION

PATENT NO.       : 7,223,053 B2  
APPLICATION NO.  : 10/931733  
DATED            : May 29, 2007  
INVENTOR(S)      : Clifford Flynn Page 1 of 1

It is certified that error appears in the above-identified patent and that said Letters Patent is hereby corrected as shown below:

Column 5, line 67, after "plurality", please insert --of--.

Signed and Sealed this

Eighteenth Day of December, 2007

JON W. DUDAS  
*Director of the United States Patent and Trademark Office*